(12) United States Patent
Morlon et al.

(45) Date of Patent: Mar. 4, 2014
(10) Patent No.: US 8,665,912 B2

(54) METHOD AND SYSTEM FOR TRANSMITTING A CLOCK RATE ON AN ETHERNET NETWORK LINK AND APPLICATIONS THEREOF

(75) Inventors: Yves Morlon, Lannion (FR); Fabrice Delêtre, Lannion (FR); Olivier Le Moult, Lannion (FR); Laurent Pommerol, Lannion (FR)

(73) Assignee: France Telecom, Paris (FR)

( * ) Notice: Subject to any disclaimer, the term of this patent is extended or adjusted under 35 U.S.C. 154(b) by 263 days.

(21) Appl. No.: 11/921,457

(22) PCT Filed: May 24, 2006

(86) PCT No.: PCT/FR2006/001195
§ 371 (c)(1),
(2), (4) Date: Feb. 4, 2008

(87) PCT Pub. No.: WO2006/131617
PCT Pub. Date: Dec. 14, 2006

(65) Prior Publication Data
US 2008/0212618 A1 Sep. 4, 2008

(30) Foreign Application Priority Data
Jun. 6, 2005 (FR) .................... 05 05711

(51) Int. Cl.
*H04J 3/06* (2006.01)
*H04L 7/00* (2006.01)
*G06F 1/10* (2006.01)

(52) U.S. Cl.
CPC *H04J 3/0685* (2013.01); *G06F 1/10* (2013.01)
USPC .......................... 370/503; 375/356

(58) Field of Classification Search
USPC .......................... 370/503; 375/356
See application file for complete search history.

(56) References Cited

U.S. PATENT DOCUMENTS

| | | | |
|---|---|---|---|
| 6,418,151 B1 * | 7/2002 | Walter et al. | 370/503 |
| 7,023,883 B1 * | 4/2006 | Lui et al. | 370/503 |
| 7,586,941 B2 * | 9/2009 | Gonda | 370/466 |
| 2002/0001299 A1 * | 1/2002 | Petch et al. | 370/350 |
| 2002/0122438 A1 * | 9/2002 | Enam et al. | 370/518 |
| 2003/0055998 A1 * | 3/2003 | Saha et al. | 709/233 |
| 2004/0003108 A1 * | 1/2004 | Knapp et al. | 709/236 |
| 2004/0062278 A1 * | 4/2004 | Hadzic et al. | 370/503 |
| 2004/0120351 A1 * | 6/2004 | Li et al. | 370/498 |
| 2004/0174902 A1 * | 9/2004 | Russell et al. | 370/466 |
| 2005/0041691 A1 | 2/2005 | Laufer et al. | |

(Continued)

OTHER PUBLICATIONS

Machine Translation of KR2003-0020745, Mar. 2008.*

*Primary Examiner* — Paul H Masur
(74) *Attorney, Agent, or Firm* — Knobbe Martens Olson & Bear LLP

(57) ABSTRACT

The invention relates to a method for transmitting a clock rate on a network link, seat of a speed timing signal (DR), consisting of at least synchronizing (A), at an input point (I) of this network, this speed timing signal with a reference external clock rate (ESR) for generating a synchronized speed timing signal (SDR) propagating on the network, and of extracting, at an output point (O) of the network, the reference external clock rate (ESR) from the synchronized speed timing signal (SDR) for utilization. The invention is for providing networks that are seats of a speed timing signal such as FastEthernet and Gigabit Ethernet networks or of higher speed Ethernet networks.

5 Claims, 4 Drawing Sheets

(56) References Cited

U.S. PATENT DOCUMENTS

| | | | |
|---|---|---|---|
| 2005/0041692 A1* | 2/2005 | Kallstenius | 370/503 |
| 2005/0053053 A1* | 3/2005 | Smith et al. | 370/352 |
| 2005/0207387 A1* | 9/2005 | Middleton et al. | 370/347 |
| 2006/0083188 A1* | 4/2006 | Kwon et al. | 370/314 |
| 2006/0245453 A1* | 11/2006 | Bedrosian | 370/503 |
| 2006/0245454 A1* | 11/2006 | Balasubramanian et al. | 370/509 |
| 2006/0256820 A1* | 11/2006 | Ilnicki et al. | 370/503 |
| 2008/0052552 A1* | 2/2008 | Christensen et al. | 713/400 |

* cited by examiner

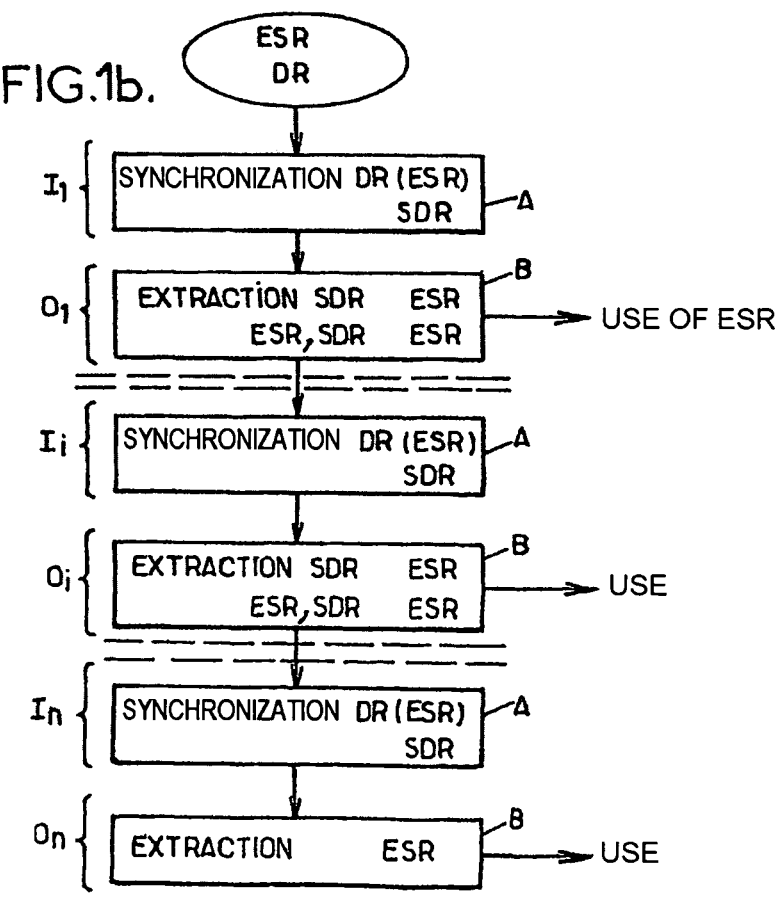

METHOD AND SYSTEM FOR TRANSMITTING A CLOCK RATE ON AN ETHERNET NETWORK LINK AND APPLICATIONS THEREOF

This application claims priority from PCT/FR2006/001195 filed May. 24 2006, which claims priority from French Application FR 05 05711, filed Jun. 6, 2005, both of which are hereby incorporated by reference in their entirety.

FIELD OF THE DISCLOSURE

The present disclosure relates to the field of high speed computer networks.

BACKGROUND

When implementing transmission networks, a synchronizing rate must be provided for certain equipment making up these networks. This is particularly the case for UMTS (Universal Mobile Telecommunications System) transmitting/receiving base stations, referred to as Node B, and, more generally, for all equipment supporting real-time applications or services.

At the present time, this synchronizing rate is delivered by a synchronizing signal originating from a primary clock exhibiting an accuracy, with respect to the UTC (coordinated universal time) frequency, of $10^{-11}$. This synchronizing signal is transported over the various parts of the network, particularly in the core, collecting or access parts, via the SDH (Synchronous Digital Hierarchy) transport layer or possibly the PDH (Plesiochronous Digital Hierarchy) transport layer.

The gradual but regular introduction of Ethernet technology for implementing networks or parts of networks has now created the problem of transporting and preserving this synchronizing rate on such networks or parts of networks.

The abovementioned problem is likely to act as a brake on the deployment of this type of network, in particular in their application to the UMTS collecting network.

Until now, there have essentially been two types of solutions proposed for transmitting and preserving the synchronizing rate:

a method referred to as adaptive, which involves retrieving the transmission rate at the network input from the rate of arrival of data packets into a receive FIFO memory, the read rate frequency of which is dependent on the level of filling of this memory;

a method referred to as a time stamp method, which involves transferring in the band, i.e. in the frames, in the form of three or four bytes, information relating to the transmission clock, in order to be able to reconstruct, at the receive end, the transmission clock rate.

In the case of the two abovementioned types, or even in the case of a combination thereof, the reconstructed or restored synchronizing signal or rate is highly dependent on the network topology, in particular on the number of nodes crossed, as well as on variations in traffic load on this network. The above-mentioned dependence results, overall, in a variation in the time for transferring packets, a phenomenon referred to as latency, when the latter pass through the network from end to end, thereby producing variations or shifts in phase, which are passed on to the reconstructed rate.

Consequently, the reconstructed rate is very poor in quality as regards synchronization and may turn out to be non-compliant or at the limit of compliance with the currently applicable standards or recommendations.

SUMMARY

An object of the present invention is to overcome the drawbacks of the solutions of the prior art in the case of networks accommodating a rate timing signal, such as Fast Ethernet or Gigabit Ethernet networks, or higher speed networks.

In particular, a subject of the present invention is the implementation of a method for transmitting and preserving a synchronizing rate, independent of the topology of the network of one of the above-mentioned types, and providing for preserving the accuracy of any external reference synchronizing signal or rate.

Furthermore, another subject of the present invention is the implementation of a system for transmitting and preserving a network synchronizing rate for one of the abovementioned types of network, providing for preserving the accuracy of any synchronizing signal or external reference rate.

The method for transmitting a synchronizing rate on a network link accommodating an initially asynchronous rate timing signal, subject of the invention, is notable in that it consists at least in synchronizing, at an input point on this network, this rate timing signal on an external reference synchronizing rate in order to generate a synchronized rate timing signal propagating on the network, and in extracting, at an output point on this network, the external reference synchronizing rate from the synchronized rate timing signal, in order to use it.

The system for transmitting a synchronizing rate on a network link, accommodating a rate timing signal, subject of the invention, is notable in that it includes at least, connected at an input point on this network, a module for synchronizing this rate timing signal on an external reference synchronizing rate, in order to generate a synchronized rate timing signal propagating on this network. It also includes, connected at an output point on this network, a module for extracting the external reference synchronizing rate from the synchronized rate timing signal, in order to use it.

The invention also covers a module for synchronizing a rate timing signal of a network link on an external reference synchronizing rate, formed by a clock signal, notable in that it includes at least one frequency converter module receiving this clock signal and delivering a higher-frequency synchronizing signal synchronized on this clock signal.

Lastly, the invention covers a module for extracting the external reference synchronizing rate from a rate timing signal synchronized on this external reference synchronizing rate, represented by a clock signal, notable in that this module includes at least one frequency converter receiving this synchronized rate timing signal and delivering a reproduced external reference synchronizing rate, having a phase relationship with the external reference rate signal.

The methods, the system and the modules for synchronizing a rate timing and for extracting an external reference synchronizing rate, subjects of the invention, can be applied to the implementation of networks accommodating a rate timing signal, such as Gigabit Ethernet networks or other networks, installed in the end equipment present at the ends of corresponding network links, or in the form of dedicated and independent synchronizing modules and extraction modules, respectively, as mentioned above.

BRIEF DESCRIPTION OF THE DRAWINGS

They will be better understood on reading the description and on examining the accompanying drawings in which:

FIG. 1a represents, purely by way of illustration, a flow chart of the essential steps for implementing the method that is a subject of the present invention;

FIG. 1b represents, by way of illustration, a flow chart of the essential steps for implementing the method, that is a subject of the invention, of FIG. 1a, in one advantageous variant that provides for independence from the topology of the network accommodating a rate timing signal;

DESCRIPTION OF THE EMBODIMENTS

Figure 2A:
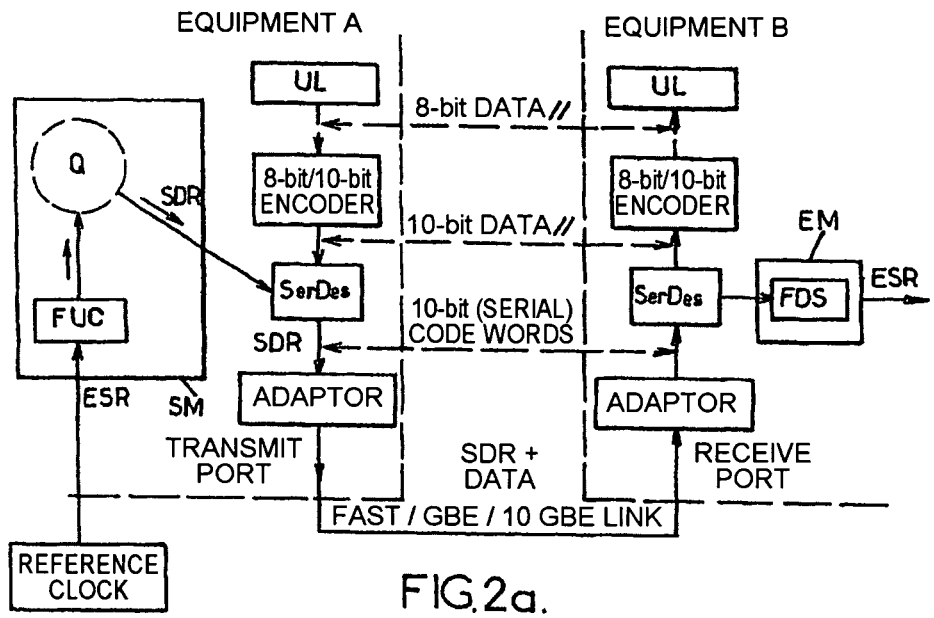
FIG. 2a represents, by way of illustration, in functional diagram form, a system for transmitting a synchronizing rate, subject of the invention, according to a first embodiment in which a synchronizing module and an extraction module are integrated in respective terminal equipment items, the terminal equipment items being linked by a network accommodating a synchronized rate timing signal enabling the external reference synchronizing signal to be extracted.

A more detailed description of the method for transmitting a synchronizing rate on a network link accommodating an initially asynchronous rate timing signal, in accordance with the object of the present invention, will now be given with reference to FIGS. 1a and 1b.

With reference to abovementioned FIG. 1a, it is noted that the method for transmitting a synchronizing rate can be implemented on any network link accommodating a rate timing signal DR and in particular on any Fast Ethernet or Gigabit Ethernet link, or higher speed link, as well as any network link that includes such a rate timing signal.

With reference to FIG. 1a, it is noted that the method that is a subject of the invention consists in synchronizing at an input point on the network, denoted by I, the rate timing signal DR on an external reference synchronizing rate, denoted by ESR. This operation is carried out at step A in FIG. 1a and is denoted by:

Synchronization DR(ESR) in order to generate a synchronized rate timing signal SDR propagating on the abovementioned network.

The method that is a subject of the invention then involves, at a step B, extracting at an output point O on the abovementioned network the external reference synchronizing rate ESR from the synchronized rate timing signal SDR. The external synchronizing rate thus restored, ESR, can then be used for any purpose, as will be described later in the description.

According to one notable aspect of the method that is a subject of the present invention, it is noted that the method consists in transferring the synchronizing rate on the network in question in synchronous mode via the synchronized rate timing signal SDR.

Thus, the synchronizing rate transmitted in synchronous mode on the network link is transmitted in a purely physical manner unlike in the method of the prior art described earlier in the description.

The procedure for the method that is a subject of the present invention is made possible insofar as on a network link, accommodating a rate timing signal, such as a Gigabit Ethernet network for example, there is always a signal on the line even when no data frame is transmitted on this network, this signal consisting of the sending of particular code words referred to as, in the context of the present application, rate timing signal. It is understood in such a scenario, for a network link mentioned above, that the method that is a subject of the invention then consists in synchronizing the line rate timing signal to 1.25 GHz when the network is a Gigabit Ethernet network with an external reference rate which, in this case, can be delivered by a primary reference clock having an accuracy of $10^{-11}$/UTC.

Following the synchronizing operation described at step A, the method that is a subject of the invention then involves at step B physically extracting the clock signal which represents the external synchronizing rate ESR.

The method that is a subject of the present invention, as represented in FIG. 1a, is particularly advantageous insofar as this method provides for not only transmitting the abovementioned synchronizing rate on a network link, but moreover preserving this synchronizing rate regardless of the topology of the network in question, as will be described below with reference to FIG. 1b.

With reference to the abovementioned figure, it is noted that following a synchronizing operation at a step A executed at an input point $I_1$ and following an extraction operation B executed at an output point $O_1$, the steps A and B of FIG. 1b being of course identical to the steps A and B of FIG. 1a, there then takes place a reinjection, at a point nearby the output point $O_1$ on the network, of the rate timing signal SDR synchronized on the extracted external synchronizing rate at a nearby input point denoted by $I_i$ in FIG. 1b.

The notion of "nearby" between an extraction point and a reinjection point covers that of the existence of an extraction port and an injection port respectively for respective signals on the same terminal equipment item for example.

The method that is a subject of the invention then consists in executing an extraction operation at any other point on the network and in repeating the synchronizing operations at successive input and output points $I_i$, $O_i$, these points being chosen so as to thus transmit and preserve the synchronizing rate, thereby providing for independence from network topology.

It is of course understood that the operation for reinjecting the rate timing signal SDR can be carried out either from the abovementioned signal SDR or, if necessary, from the extracted external reference synchronizing rate signal ESR which can then be used to reproduce a synchronized rate timing signal SDR, as will be described later in the description.

The process can be repeated successively up to an input point $I_n$ and an output point $O_n$ for extraction, considering terminal equipment items to be synchronized.

A system for transmitting a synchronizing rate on a network link, accommodating a rate timing signal, in accordance with the object of the present invention, will now be described with reference to FIG. 2a.

With reference to FIG. 2a it is noted that the system that is a subject of the invention can be installed directly in the Gigabit Ethernet end equipment present at each of the ends of the links chosen to transfer the synchronized rate timing on the network link of the Gigabit Ethernet network in question.

Thus, with reference to FIG. 2a it is noted that the system that is a subject of the invention comprises a synchronizing module SM for synchronizing the rate timing signal on an external reference synchronizing rate ESR. The module SM is used to generate the synchronized rate timing signal SDR propagating on the network.

In FIG. 2a, there is represented the end equipment A, represented by the network link upper layers, denoted by UL, and delivering 8-bit data in parallel, an 8-bit/10-bit encoder for delivering 10-bit parallel data and a serializer-deserializer circuit denoted by SerDes delivering serial 10-bit coded words to an adapter forming a transmit port and in particular forming a link by Gigabit Ethernet network link over a copper line, optical line or other physical medium. The abovementioned transmit port is then linked via the network link to the end equipment B forming the other end equipment item.

The end equipment B is also represented by the upper layers of the latter UL, an 8-bit/10-bit encoder and a serializer-deserializer circuit SerDes, as well as by an adapter forming the receive port to which the Gigabit Ethernet link is connected, actually providing for linking the end equipment A to the end equipment B.

With reference to FIG. 2a, the system that is a subject of the invention also includes, connected at an output point on the network in question, an extraction module EM for extracting the external reference synchronizing rate from the synchronized rate timing signal SDR.

In FIG. 2a, the extraction module EM is connected at the serializer-deserializer circuit SerDes representing the end equipment B. The extracted external reference synchronizing rate ESR can then be used for synchronizing purposes, this external reference synchronizing rate ESR exhibiting a phase relationship with the original external reference synchronizing rate ESR and retaining all the accuracy and frequency qualities thereof.

It is understood, in particular, that the supply of the rate signal (corresponding to the rate of the signal SDR divided by a factor k) by the synchronizing module SM to the serializer-deserializer circuit of the equipment A actually enables the synchronized rate timing signal SDR to be generated and delivered to the adapter circuit and to the transmit port for transmission on the link line (Fast or Gigabit Ethernet, or a higher speed line). The synchronized rate timing signal SDR is then transmitted to the adapter and to the receive port of the end equipment B and, in particular, to the serializer-deserializer circuit SerDes of the latter and finally to the extraction module EM to extract the external reference synchronizing rate ESR.

As will be further observed in FIG. 2a, the synchronizing module SM includes, advantageously, a clock signal forming the external reference synchronizing rate ESR, this clock signal advantageously being able to be delivered by a reference clock delivering, for an actual specific implementation of the system that is a subject of the present invention, a reference signal at 2.048 MHz with an accuracy of $\pm 10^{-11}$/UTC.

The synchronizing module SM also includes a frequency converter circuit FUC, this frequency converter circuit changing the frequency of the clock signal ESR by increasing it and therefore being denoted by FUC. The frequency converter circuit is thus a frequency multiplier circuit which delivers a synchronizing signal at a frequency that is higher and synchronized on the external reference synchronizing rate ESR.

The synchronized higher-frequency synchronizing signal delivered by the converter circuit FUC can, if necessary, be raised to a frequency that is sufficient to form the signal SDR forming the synchronized rate timing for example.

However, in one preferred embodiment of the system that is a subject of the present invention and, in particular, of the synchronizing module SM, the latter also includes a phase-locking circuit, denoted by Q, receiving the synchronized higher-frequency synchronizing signal and delivering the synchronized rate timing to the serializer-deserializer circuit SerDes.

It is understood, in particular, that the phase-locking circuit Q can advantageously be formed by a quartz oscillator available in the end equipment A and normally intended to generate the control signal of the serializer-deserializer circuit in order to transmit data over the Fast/Gigabit Ethernet link and also to transmit particular code words forming the rate timing transmitted on the corresponding network link.

In this scenario, the phase-locking effect of the phase-locking circuit, i.e. ultimately of the abovementioned quartz resonator, provides for, on the one hand, creating the abovementioned rate timing and, on the other hand, synchronizing the latter on the external reference synchronizing rate ESR, i.e. on the clock signal representing the latter.

As regards implementing the external reference rate extraction module EM at the end equipment B, it is noted that in a manner similar to the synchronizing module SM described previously, it advantageously includes at least one frequency converter module, denoted by FDS, directly linked to the serializer-deserializer circuit SerDes of the terminal equipment B and therefore receiving the synchronized rate timing signal SDR in order to deliver, by a frequency division conversion for example, the reproduced external reference rate ESR having a phase relationship with the original external reference rate ESR.

Figure 2B:
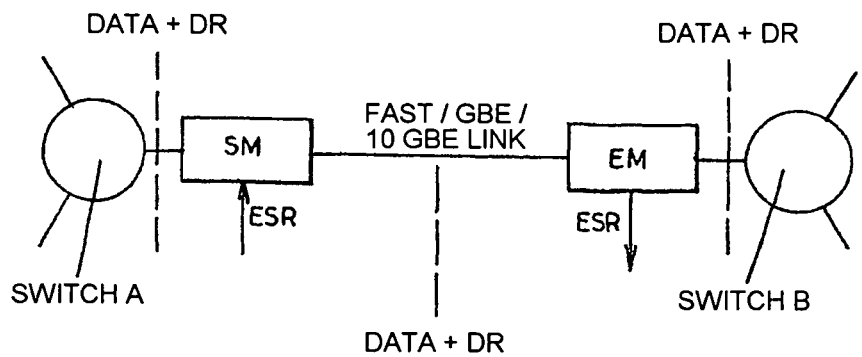
FIG. 2b represents, by way of illustration, a system for transmitting a synchronizing rate, subject of the invention, according to a second embodiment in which a synchronizing module and an extraction module are connected in the form of separate dedicated modules to respective terminal equipment items and linked by a network accommodating a synchronized rate timing signal enabling the external reference synchronizing signal to be extracted.

Of course, the embodiment of FIG. 2a is not limiting. It is understood in particular that when, for cost reasons or for implementation reasons, it is not desirable to modify the terminal equipment A and/or the terminal equipment B, the system that is a subject of the invention can, furthermore, consist in installing the synchronizing module SM and/or the extraction module EM in an independent dedicated module external to each of the end equipment items A and B described previously. This embodiment is represented in FIG. 2b in which the end equipment A is considered to be formed by a Gigabit Ethernet switch A and the end equipment B is considered to be formed by a Gigabit Ethernet switch B.

In this scenario, each of the abovementioned switches is linked by a Gigabit Ethernet link GbE via the synchronizing module SM of the abovementioned Gigabit Ethernet link and via the extraction module EM as represented in the abovementioned figure. Just as in the case of FIG. 2a, the abovementioned Gigabit Ethernet link GbE then enables data and the synchronized rate timing SDR to be transmitted.

Figure 2C:
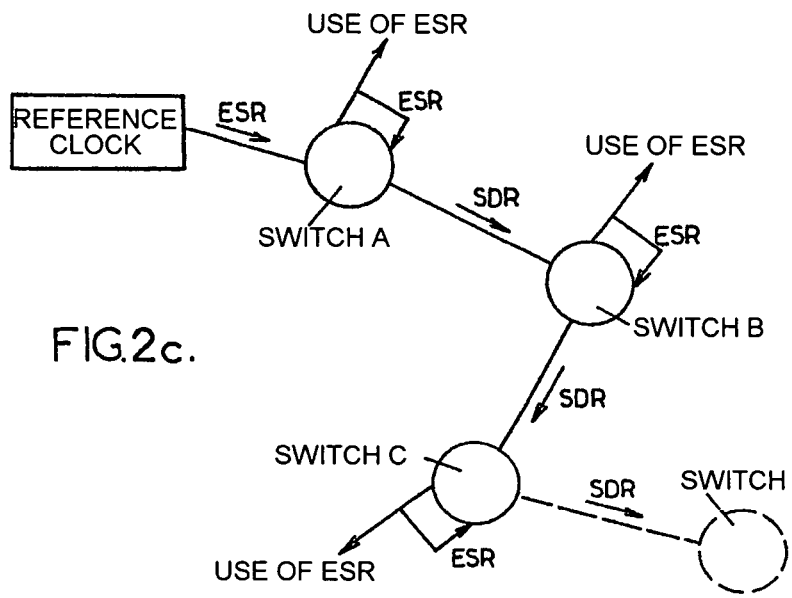
FIG. 2c represents, by way of illustration, the configuration of a system that is a subject of the invention, enabling the method that is a subject of the invention, and as illustrated in FIG. 1b, to be implemented in a manner that is totally independent of the topology of the network accommodating the synchronized rate timing signal.

A Gigabit Ethernet network configuration, actually formed by a plurality of successive Gigabit Ethernet network links implementing the method that is a subject of the present invention as represented in FIG. 1b, is represented in FIG. 2c.

In abovementioned FIG. 2c, it is observed that the external reference synchronizing rate ESR is injected first from a reference clock at a Gigabit Ethernet switch, GbE switch, and that at this switch the external reference synchronizing rate ESR is extracted in order to be used and reinjected at this same switch in order to generate the synchronized rate timing SDR which is then propagated on the network and, in any case, between a Gigabit Ethernet network link between two GbE switches in question. This process is then repeated successively between GbE switches delimiting successive Gigabit Ethernet network links. It is understood that in this scenario, as mentioned earlier in the description, the external reference synchronizing rate ESR after extraction can be reinjected either at the GbE switch or at a point nearby the latter or that, if necessary, the synchronized rate timing signal SDR can be generated and sent on the network as mentioned previously in the description.

It is understood, in particular, that the configuration represented in FIG. 2c can be executed for Gigabit Ethernet network links referred to as synchronizing links, the other links, for which synchronization is not required, able of course to remain asynchronous.

A more detailed description of specific applications of the method and of the system, subjects of the present invention, in their particular embodiment will now be given with reference to FIG. 3a and FIG. 3b.

Figure 3A:
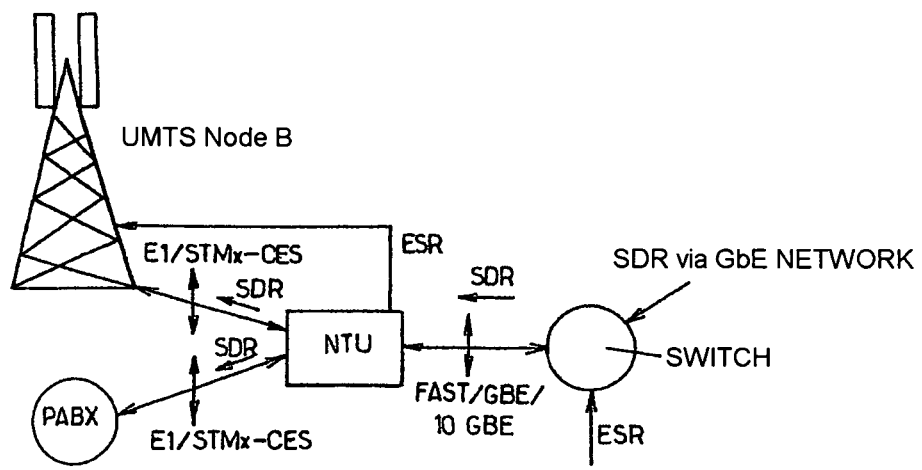
FIG. 3a represents, by way of illustration, a first example application of an implementation of the method and/or system that are subjects of the invention, between an end equipment item linked to a UMTS base station and a Gigabit Ethernet network switch.

With reference to FIG. 3a, it is noted that the method and the system, subjects of the present invention, can be implemented to transport and preserve the external reference rate in order to solve the problem of transferring the synchronizing rate on the last section, also referred to as the "last mile", of a UMTS base station.

In this scenario, as represented in FIG. 3a, conventionally a GbE switch is linked by a GbE network link to an end equipment item denoted by NTU (Network Termination Unit) linked to a PABX telephony switch and to the UMTS base station denoted by UMTS Node B.

The GbE switch receives either the synchronized rate timing SDR via a network or via a GbE network link, or the external synchronizing rate signal ESR. It delivers the synchronized rate timing SDR over a Gigabit Ethernet link to the end equipment module NTU. The synchronized rate timing SDR can be transmitted directly to the PABX switch or to the UMTS base station via an E1/STMx-CEs link. Furthermore, the external synchronizing rate signal ESR can also be transmitted directly to the UMTS base station.

The synchronized rate timing SDR is transmitted to the PABX switch, respectively to the UMTS base station, by the NTU module making available emulated TDME1, E3, STMx channels. This guarantees that the synchronizing rate transferred is of high quality and compliant with the currently applicable standards since the TDM frames are recreated from the abovementioned rate.

The transferred synchronizing rate may also be transferred directly via the external reference signal ESR in order to provide for direct synchronization of a local customer equipment item by frequency link for example.

Figure 3B:
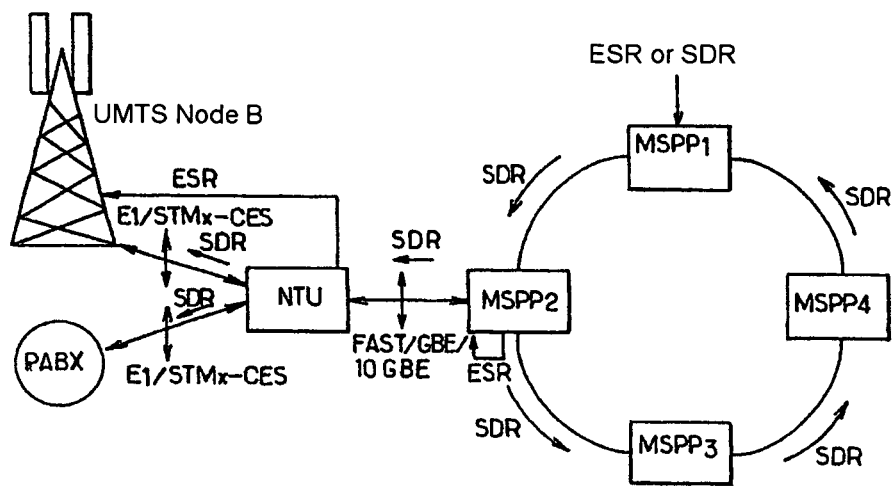
FIG. 3b represents, by way of illustration, a second example application of an implementation of the method and/or system that are subjects of the invention, between an end equipment item linked to a UMTS base station and a multiservice platform or SDH equipment item.

In FIG. 3b, the configuration is similar to that of FIG. 3a from the point of view of the terminal equipment NTU. However, the end equipment is this time an MSPP (MultiService Provisioning Platform) or an SDH equipment item equipped with a GbE interface.

In this application, the synchronizing rate originating from the current synchronizing network is then injected conventionally through its $T_3$ input and transported over the latter. It is therefore available at the time base of each of the SDH or MSPP machines of the ring thus formed.

By virtue of implementing the method and the system, subjects of the present invention, in this scenario the abovementioned synchronizing rate can be retrieved easily in order to transfer it on each GbE interface, as described earlier in the description.

The invention claimed is:

1. A system for transmitting an external reference synchronizing rate on a network link adapted for asynchronous signal transmission, said system including at least, connected to an input point on said network link:
    a system component configured to generate a synchronized rate timing signal from an initially asynchronous rate timing signal, based on the external reference synchronizing rate connected to an output point on said network link, wherein said synchronized rate timing signal is generated for propagation on said network link adapted for asynchronous signal transmission; and
    a system component configured to extract said external reference synchronizing rate from said synchronized rate timing signal,
    wherein the external reference synchronizing rate is formed by a clock signal;
    wherein said system component configured to generate a synchronized rate timing signal includes:
    the clock signal; and
    a frequency converter which receives said clock signal and delivers a synchronizing signal at a higher frequency or at a frequency that is synchronized with the external reference synchronizing rate; and
    wherein said system component configured to generate a synchronized rate timing signal also includes a phase-locking component which receives said synchronized higher-frequency synchronizing signal and delivers said frequency that is synchronized with the external reference synchronizing rate.

2. A system for transmitting an external reference synchronizing rate on a network link adapted for asynchronous signal transmission, said system including at least, connected to an input point on said network link:
    a system component configured to generate a synchronized rate timing signal from an initially asynchronous rate timing signal, based on the external reference synchronizing rate connected to an output point on said network link, wherein said synchronized rate timing signal is generated for propagation on said network link adapted for asynchronous signal transmission; and
    a system component configured to extract said external reference synchronizing rate from said synchronized rate timing signal,
    wherein the external reference synchronizing rate is formed by a clock signal and wherein said system component configured to generate a synchronized rate timing signal is connected to the input point on said network link via a serializer-deserializer circuit.

3. A system for transmitting an external reference synchronizing rate on a network link adapted for asynchronous signal transmission, said system including at least, connected to an input point on said network link:
    a system component configured to generate a synchronized rate timing signal from an initially asynchronous rate timing signal, based on the external reference synchronizing rate connected to an output point on said network link, wherein said synchronized rate timing signal is generated for propagation on said network link adapted for asynchronous signal transmission; and
    a system component configured to extract said external reference synchronizing rate from said synchronized rate timing signal, wherein the external reference synchronizing rate is formed by a clock signal and wherein said system component configured to extract the external reference synchronizing rate includes at least a frequency converter which receives said synchronized rate timing signal and delivers a reproduced external reference synchronizing rate having a phase relationship with said external reference synchronizing rate.

4. A system for transmitting an external reference synchronizing rate on a network link adapted for asynchronous signal transmission, said system including at least, connected to an input point on said network link:
- a system component configured to generate a synchronized rate timing signal from an initially asynchronous rate timing signal, based on the external reference synchronizing rate connected to an output point on said network link, wherein said synchronized rate timing signal is generated for propagation on said network link adapted for asynchronous signal transmission; and
- a system component configured to extract said external reference synchronizing rate from said synchronized rate timing signal, wherein the external reference synchronizing rate is formed by a clock signal and wherein said system component configured to extract the external reference synchronizing rate is connected to the output point on said network link via a serializer-deserializer circuit.

5. A module for synchronizing an initially asynchronous rate timing signal, adapted to be propagated on a network link which is configured for asynchronous signal transmission, with an external reference synchronizing rate formed by a clock signal, said module comprising:
- a first input designed to receive said initially asynchronous rate timing signal,
- a second input designed to receive the clock signal, and
- an output for propagating the synchronized rate timing signal over said network link configured for asynchronous signal transmission;
- wherein said synchronized rate timing signal is generated from the initially asynchronous rate time signal based on the external reference synchronizing rate, and
- wherein said module includes a frequency converter which delivers a higher-frequency synchronizing signal synchronized on said received clock signal.

* * * * *